United States Patent

Billarant

[15] 3,673,301
[45] June 27, 1972

[54] FLEXIBLE BANDS FITTED WITH HOOKS FOR THE FABRICATION OF SEPARABLE FASTENING DEVICES

[72] Inventor: Patrick Billarant, 20, Avenue des Folies Chaillou, Nantes, Loire-Atlantique, France

[22] Filed: Dec. 2, 1969

[21] Appl. No.: 881,533

[30] Foreign Application Priority Data

Dec. 3, 1968 France..............................68176343

[52] U.S. Cl..............................264/163, 264/230, 264/322
[51] Int. Cl......................................B29c 17/14, B29c 23/00
[58] Field of Search ........................264/154, 163, 230, 342; 83/177, 53

[56] References Cited

UNITED STATES PATENTS

| 3,363,038 | 1/1968 | Billarant | 264/172 X |
| 3,270,408 | 9/1966 | Nealis | 264/230 X |
| 3,012,918 | 12/1961 | Schaar | 264/154 X |
| 3,394,211 | 7/1968 | MacDuff | 264/154 |
| 3,092,439 | 6/1963 | Harrison | 264/154 |
| 3,085,024 | 4/1963 | Blackford | 264/154 UX |
| 2,032,923 | 3/1936 | Eldridge | 264/154 X |
| 3,546,754 | 12/1970 | Erb | 264/230 X |

FOREIGN PATENTS OR APPLICATIONS

| 1,073,605 | 6/1967 | Great Britain | 83/53 |
| 544,001 | 1/1956 | Belgium | 83/177 |

Primary Examiner—Robert F. White
Assistant Examiner—Allen M. Sokal
Attorney—Ostrolenk, Faber, Gerb & Soffen

[57] ABSTRACT

A flexible band having hooks formed of threads of thermoplastic material for engagement with a similar flexible band having elements adapted to cooperate with said hooks so as to constitute a separable fastening device, in which the hooks are obtained by cutting one of the two loop arms of thermoplastic threads, the cutting operation being carried out at a predetermined distance from the crest of each loop. A terminal enlargement is essentially formed on at least one of the two thread extremities which result from the cutting operation.

3 Claims, 5 Drawing Figures

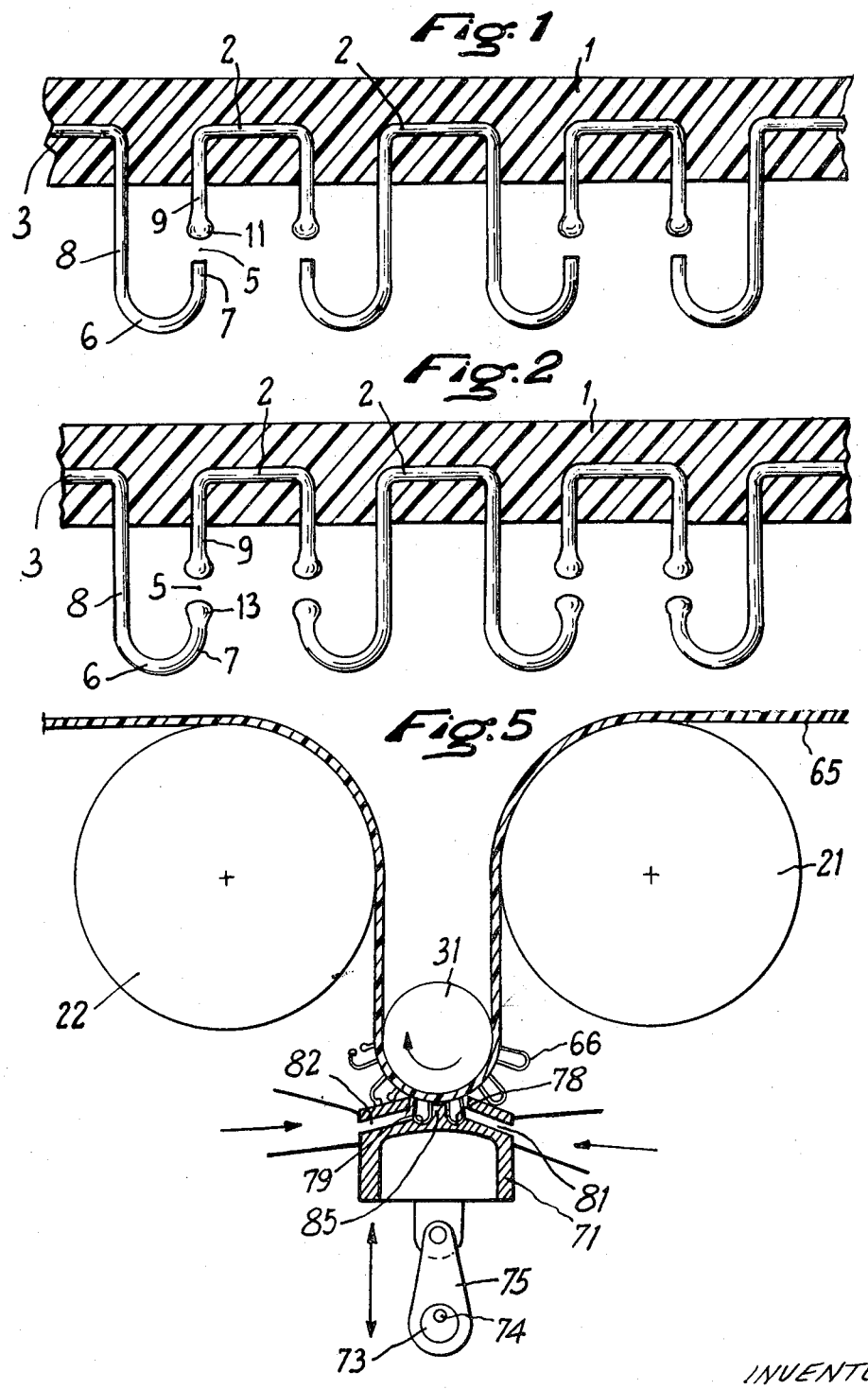

Patented June 27, 1972

INVENTOR
PATRICK BILLARANT
By
Ostrolenk, Faber, Gerb & Soffen
ATTORNEYS

FLEXIBLE BANDS FITTED WITH HOOKS FOR THE FABRICATION OF SEPARABLE FASTENING DEVICES

The present invention relates to flexible bands which are provided with hooks formed of thermoplastic material and which are intended to be utilized in conjunction with bands provided with elements adapted to cooperate with said hooks, thereby constituting separable fastening means such as devices of the type which provide instantaneous engagement and release for purposes of closure or attachment.

This invention is more particularly concerned with bands of the type mentioned above in which said hooks are obtained by cutting one of the two arms of loops of threads of thermoplastic material, this cutting operation being carried out at a predetermined distance from the crest of each loop.

The invention applies not only to bands of the type in which the hooks are embedded in a sole or base sheet of plastic material but also to all bands or strips fitted with hooks, irrespective of the modes of formation and attachment of said hooks, whether such hooks are obtained, for example, by cutting the loops of a woven product or by molding so as to be integral with the band or plate.

The object of the invention is to enhance the "gripping power", or capacity of the flexible bands for secure attachment to the similar bands with which they are associated.

With this objective, in an improved flexible band according to the invention, provision is made for a terminal enlargement on at least one of the two thread extremities formed by cutting one arm of a thread loop in order to form a hook.

In one embodiment in which said terminal enlargement is formed on the curved portion of the hook, it is apparent that when a hook of this type exerts a substantial effort on the element to which it is fastened, said hook first opens and then carries out a sliding movement. However, prior to final disengagement, the terminal enlargement of the hook grips said element, thereby extending the retaining action of the hook and considerably increasing the gripping power of the separable fastening device which is provided with hooks of this type.

In another embodiment, provision is made not only for a terminal enlargement on the curved portion of the hook but also for an additional terminal enlargement on the cut portion of the loop arm which is embedded in and secured to the band. In this embodiment, each hook whose gripping power has already been considerably increased is duplicated by a second fastening element constituted by said cut portion of the loop arm and terminal enlargement which is also adapted to engage with a corresponding element of an associated flexible band. In respect of a given number of hooks, the band considered therefore has a number of fastening elements which is double the number of hooks after formation of said additional terminal enlargement.

In consequence, the enlarged extremity of the hook enhances the gripping power of this latter and the enlarged extremity of that portion of the loop arm which is secured to the band doubles the number of fastening elements. The result thereby achieved is a very considerable increase in the gripping power of the band which is treated in this manner.

Should it be desired to do so, it is also possible in accordance with the invention to form bands in which an enlargement is not formed on the curved extremity of each hook whereas provision is made for a terminal enlargement on the cut portion of loop arm which is secured to the flexible band. Alternatively, bands can be provided with hooks having terminal enlargements whilst the cut projecting portion of loop which is secured to the band is of very short length and may even be non-existent.

The invention is also directed to a method whereby terminal enlargements of the type referred-to are formed on the fastening elements of said flexible bands.

This method consists in forming the terminal enlargement by means of an application of heat so as to cause partial melting of the thread extremity on which an enlargement is to be formed.

In one mode of operation, use is made of an electric heating resistor which is brought close to the thread extremity of the thread on which an enlargement is to be formed. In another mode of operation, a thin stream of air at a suitable temperature is directed onto the thread of thermoplastic material on which it is desired to form a terminal enlargement. Thus, partial local melting of the thread, which is oriented thermoplastic, is produced in both modes of operation, thereby resulting in the natural formation of a ball-shaped terminal enlargement.

In one mode of execution which is adopted for the treatment of a band in which hooks have already been formed by cutting one of the two arms of thread loops, a stream of hot air is directed onto the extremity of the curved portion of the hook and/or onto the extremity of the cut projecting portion of loop arm which is secured to the band.

In another mode of execution, a stream of hot air is directed onto one of the two arms of thread loops at a predetermined distance from the crest of each loop in order to carry out at the same time the cutting of said loop arm for the purpose of forming a hook, the formation of a terminal enlargement on the curved extremity of the hook and the formation of a terminal enlargement on the portion of the loop arm which is secured to the band.

Finally, the invention is concerned with means for carrying out the method under consideration.

A device according to the invention comprises a rotary cylinder having a relatively small diameter in order to separate the fastening elements of a flexible band which passes over said cylinder and a nozzle for directing hot air onto those parts of said elements on which a terminal enlargement is to be formed.

The invention is also concerned with embodiments which have at least one of the following features :

a. The device which is intended to form terminal enlargements only on the cut projecting portions of the thread-loop arms which are secured to a flexible band on which the hooks have already been formed by cutting said loop arms comprises a freely rotatable drum which is substantially tangent to said small-diameter cylinder, longitudinal fins being provided on the periphery of said drum and shaped so as to penetrate in turn into the aforementioned cuts formed in the loops of the band which is driven in uniform motion on said cylinder, said drum being provided with longitudinal slits between said fins in order to establish a temporary communication between a hot air discharge nozzle disposed on the inside of said drum and the corresponding space formed between two fins, said fins being adapted to retain one or two of the aforementioned portions of loop arms which are to be provided in turn with a terminal enlargement.

b. The device which serves both to cut one thread-loop arm and to form an enlargement on each of the two thread extremities thus formed comprises a cap to which is imparted a radial movement with respect to the aforementioned small-diameter cylinder over which the band passes, a longitudinal channel for retaining a transverse row of loops being formed in said cap and a duct connected to a source of hot air under pressure being adapted to open laterally into said channel, the periodic radial motion of the cap being carried out in synchronism with the forward motion of the band.

The invention is also concerned with separable fastening devices comprising at least one band as defined in this Application.

A better understanding of the invention will be gained from the following description, reference being made to the accompanying drawings in which a few embodiments of the invention are shown by way of non-limitative example, and in which :

FIG. 1 is a sectional view on a large scale showing a portion of a first embodiment of a flexible band which is provided with improved fastening elements in accordance with the invention ;

FIG. 2 is a view of another embodiment ;

FIG. 5 is a diagrammatic view of a device for obtaining bands of the type illustrated in FIG. 2.

Figure 3:
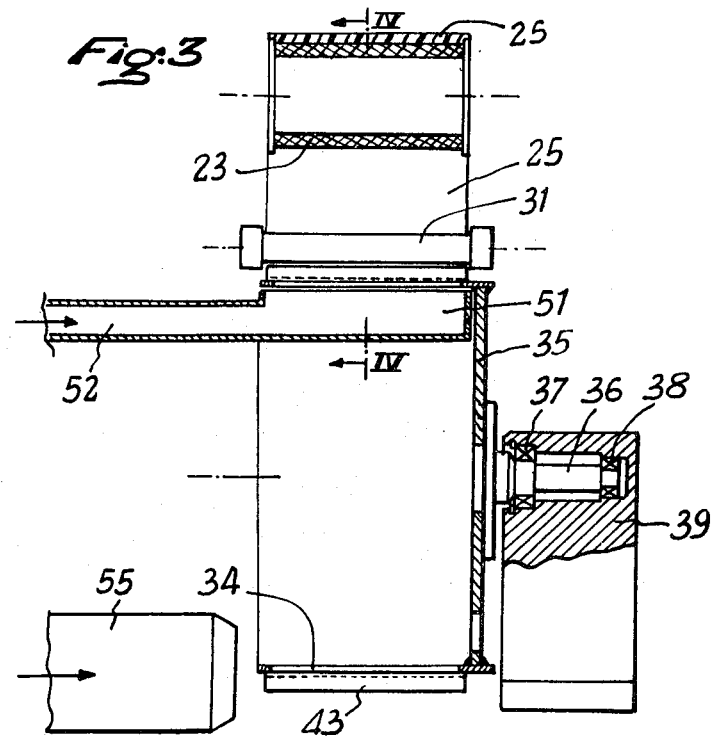
FIG. 3 is a diagrammatic sectional view of a device for obtaining bands of the same type as the band which is illustrated in FIG. 1.

The flexible band, a portion of which is shown in FIG. 1, is constituted by a sole or base sheet 1 of thermoplastic material, for example, in which are embedded the internal loops 2 located on one side of a layer of parallel undulated threads 3 which are also made of thermoplastic material and the melting point of which is close to that of the base sheet 1. One arm of each of the loops of longitudinal threads is cut as shown at 5 at a given distance from the crests 6 of the undulations so that the uncut arm 8 of each loop forms the stem of a hook whose curved portion is constituted by the crest 6 of the wave and the portion 7 which is adjacent to the cut 5. The cut extremity of the other arm 9 of each loop is provided with an enlarged portion 11 which has substantially the shape of a ball in the example shown in the drawings. Each terminal enlargement 11 of said band is therefore capable of engaging in a corresponding element of a second band which is associated with the first, said element being either in the form of a loop or, for example, of transverse threads of an undulated system which is secured to a flexible base sheet. The first flexible band therefore has a total number of fastening elements which is double the number of hooks.

In the alternative form which is illustrated in FIG. 2, the extremities of the curved portions 7 of the hooks also terminate in an enlarged portion 13 and this latter is also given the shape of a ball in the example illustrated. These enlarged extremities serve to increase to a very substantial extent the gripping power or capacity of the hook 7 for secure engagement with the elements of an associated band.

Figure 4:
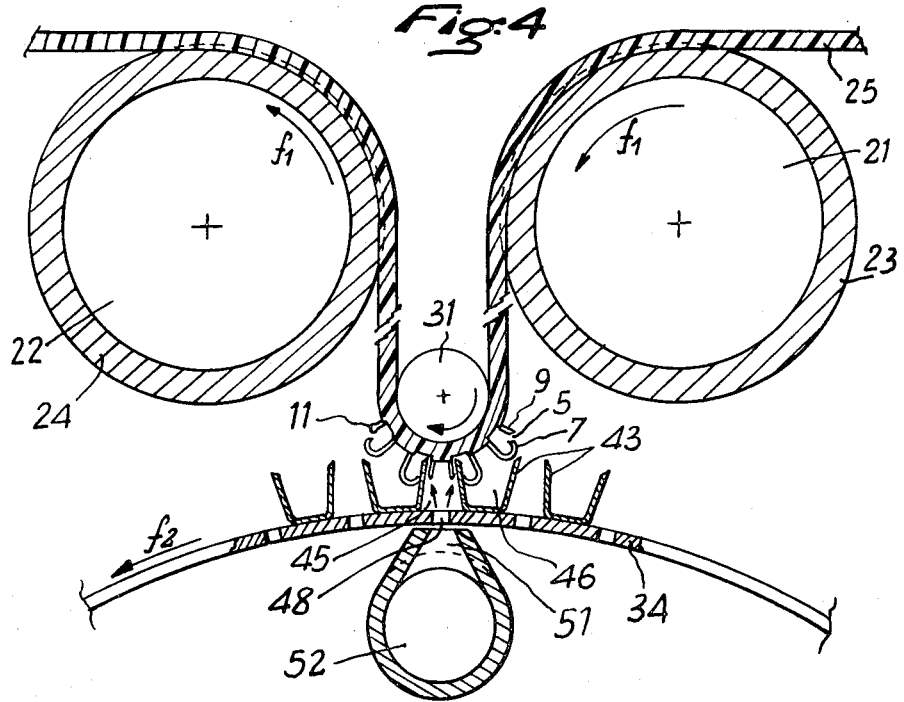
FIG. 4 is a sectional view on a smaller scale and taken along line IV—IV of FIG. 3.

The device which is illustrated in FIG. 3 and 4 makes it possible to obtain the enlarged extremities 11 of the band which is illustrated in FIG. 1.

This apparatus comprises two horizontal cylinders 21, 22 which are provided respectively with a fabric covering 23, 24 and over which is passed a band 25 having a structure as illustrated in FIG. 1 except for the fact that the loop-arm portions 9 have not yet been provided with terminal enlargements but are already separated from the portion 7 of the hook by the cut 5.

A roller 31 of relatively small diameter is mounted between the two rotary cylinders 21, 22 and at a lower level than these latter, the flexible band 25 being adapted to pass over said small roller in order to ensure that the hooks should open out to a substantial extent as the sole or base sheet of said band is taken up by the cylinder 31 which has a small radius of curvature, or in other words that the extremity 7 of each hook should move away from the extremity of the opposite arm 9 which is joined to the base sheet as shown in FIG. 4.

The fabric coverings 23, 24 of the two cylinders 21, 22 serve to protect the hooks as these latter pass over said cylinders since they are located on that side of the band which is in contact with said cylinders.

A drum 34 which is substantially tangent to the small-diameter roller 31 is rigidly fixed to an end-plate 35 carried by a shaft 36 and this latter is journalled in two bearings 37, 38 which are mounted in a stationary support 39.

Fins 43 are fixed on the periphery of the drum 34 and are intended to engage between the stem of each hook and the arm of the loop in which said hook has been formed and which is located opposite to the arm which forms said stem.

In the embodiment which is illustrated, the hooks are placed back to back in pairs so that the two portions 9 of the arms of two successive loops of longitudinal threads such as 3 are retained between two fins 43. All the loops are aligned in the transverse direction so that the fins 43 extend over the entire width of the band 25 and retain a complete row of loops.

The fins which are formed on the periphery of the drum therefore provide a succession of chambers such as the chamber 45 which retain two portions of arms such as the portion 9 and chambers such as the chamber 46 in which corresponding hooks are received progressively as the band moves forward and is accompanied in its movement by the freely rotating drum.

Slits 48 extend over the entire width of the drum opposite to the chambers 45, thereby providing a communication between said chambers and a transverse nozzle 51 which is connected by means of a duct 52 to a source of air under pressure at a temperature which is sufficient to ensure partial melting of the material of the arms 9 of the longitudinal threads 3.

A nozzle 55 blows cold air onto the periphery of the drum 34 and the fins 43 in order to cool these latter and to prevent any damage to the hooks 7.

The operation takes place as follows:

at least the downstream cylinder 22 is driven in the direction of the arrow f1 so that the band 25 passes round the small-diameter roller 31 and is permitted by its hooks and by the fins 43 of the drum 34 to drive this latter in the direction of the arrow f2. Each time two arms 9 are imprisoned within a chamber 45 between two fins 43 of the drum and when the slit 48 of the drum passes in front of the nozzle 51, the hot air which is discharged through said nozzle reaches the two extremities of said arms in a transient manner and forms two substantially ball-shaped terminal enlargements 11 as a result of partial melting of said extremities whilst the extremities of the hooks 7 which are protected by the fins against the action of the hot air remain intact. The band which is thus treated then passes over the cylinder 22 and then has the appearance which is shown in FIG. 1.

In FIG. 5, there is shown diagrammatically another device for obtaining bands of the same type as those which are shown in FIG. 2.

This device comprises two rotary cylinders which are identical to the cylinders 21, 22 of the embodiment of FIGS. 4 and 5 as well as a small-diameter roller 31 over which the flexible band 65 passes. In this example, the flexible band is designed in the form of a sole 1 of thermoplastic material in which are embedded the undulations of one face of a layer of parallel undulated threads 3 which consequently form closed loops 66 on the other face.

A cap 71 is designed and arranged to move up against the small-diameter roller 31 and to move away from this latter periodically and in synchronism with the forward motion of the band 65 under the action of any suitable mechanism such as the link-arm and crank system which is shown in the drawings. This system comprises an eccentric 73 which is carried by a pin 74 and connected by means of a link-arm 75 to the cap 71, said cap being suitably guided as it carries out its radial movement with respect to the roller 31 by any suitable means of conventional type (not shown in the drawings).

The cap 71 is provided with two channels 78, 79 in which two rows of loops 66 of the band 65 are intended to fit exactly and in the manner which is illustrated.

The cap 71 is provided with lateral ducts 81, 82 which are connected to a source of hot air under pressure and open into the two channels 78, 79 respectively at a distance from the bottom of said channels which corresponds to the location at which one of the two arms of the two loops 66 is to be cut as indicated at 5 in FIG. 2, the other arm of these two loops being applied against a central rib 85 of the cap 71.

The operation of the device is as follows:

as the band 65 moves forward and each time the cap 71 covers two rows of loops 66, the hot air which flows through the ducts 81, 82 causes partial melting of one of the two arms of each loop of the two transverse rows of loops considered, thereby cutting said arm so as to form a hook and forming at the same time a terminal enlargement on each of the two resultant extremities of the cut thread, namely a terminal enlargement such as 13 which is formed on the curved extremity 7 of the hook and a terminal enlargement such as 11 formed on the extremity of the arm 9 which is joined to the base sheet 1.

The ducts 81 and 82 are designed, for example, in the form of slits which extend over the entire width of the cap 71 or else only in the form of holes which open directly in front of each loop 66.

We claim:

1. A method for producing fastening means comprising a flexible band having longitudinal closely spaced parallel rows of undulated oriented thermoplastic threads imbedded by their roots in said band and each undulating thread defining a hook and straight projection, the free ends of each hook being directed toward the base and aligned with straight projections respectively, the facing free ends of each hook and of its associated straight projection being normally in close relationship, including the steps of longitudinally and resiliently bending the band into a curvature of small radius by passing the band over a smooth curved surface of small diameter, for causing said facing free ends to angularly move apart from one another, and locally heating, at least one of said free ends to form an enlargement on same by melting, whereby the said end provided with said enlargement is moved out of contact with the other end and said ends are prevented from sticking to the melted material forming said enlargements.

2. The method of claim 1, wherein only the free ends of the straight projections are provided with said enlargements respectively, a heat shield being inserted between a hook and its associated straight projection during heating of the free end of said projection.

3. A method for producing fastening means comprising a flexible band having longitudinal closely spaced parallel rows of undulated oriented thermoplastic threads imbedded by their roots in said band, each undulating thread defining a U-shaped projection extending outwardly from said band, including the steps of:

longitudinally and resiliently bending the band into a curvature of small radius by passing the band over a smooth curved surface of small diameter;

locally heating at least one row of said U-shaped projections to separate said U-shaped projection into a hook and a straight projection, the free ends of each hook being directed toward the base and being aligned with its associated straight projection, the facing free ends of each hook and of its associated straight projection being normally in close relationship;

said bending of said band over said smooth curved surface of small diameter causing said associated hook-shaped and straight projections to separate somewhat;

said heating being continued in said local area to form an enlargement at the free ends of the hook and straight projections while said free ends remain separated from one another due to the bending of said band whereby said enlargements are kept apart due to the bending of said band; and shielding adjacent rows of undulations from the row being heated.

* * * * *